(12) United States Patent
Schibuk

(10) Patent No.: US 9,396,339 B2
(45) Date of Patent: *Jul. 19, 2016

(54) PROTECTING COMPUTERS USING AN IDENTITY-BASED ROUTER

(71) Applicant: InferSpect, LLC, Wellesley, MA (US)

(72) Inventor: Norman Schibuk, Merrick, NY (US)

(73) Assignee: InferSpect, LLC, Wellesley, MA (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/312,044

(22) Filed: Jun. 23, 2014

(65) Prior Publication Data

US 2014/0304523 A1 Oct. 9, 2014

Related U.S. Application Data

(63) Continuation of application No. 13/324,737, filed on Dec. 13, 2011, now Pat. No. 8,776,212.

(60) Provisional application No. 61/422,854, filed on Dec. 14, 2010.

(51) Int. Cl.
*G06F 7/04* (2006.01)
*G06F 21/60* (2013.01)
*H04L 9/32* (2006.01)

(52) U.S. Cl.
CPC .............. *G06F 21/602* (2013.01); *H04L 9/321* (2013.01); *H04L 2209/76* (2013.01)

(58) Field of Classification Search
CPC ............................... G06F 21/44; G06F 21/445
USPC ...................................................... 726/16–21
See application file for complete search history.

(56) References Cited

U.S. PATENT DOCUMENTS

| 8,578,161 | B2* | 11/2013 | Smith | H04L 9/3252 380/30 |
| 8,607,045 | B2* | 12/2013 | Bailey | H04L 9/0866 713/168 |
| 8,667,303 | B2* | 3/2014 | Nasir | G06F 21/42 710/2 |
| 2008/0235513 | A1* | 9/2008 | Foster | G06F 21/33 713/185 |
| 2009/0183010 | A1* | 7/2009 | Schnell | G06F 21/10 713/193 |
| 2010/0241867 | A1 | 9/2010 | Brown et al. | 713/185 |
| 2011/0289134 | A1* | 11/2011 | de los Reyes | H04L 63/20 709/203 |
| 2013/0159723 | A1* | 6/2013 | Brandt | G06F 21/6218 713/176 |

OTHER PUBLICATIONS

Qian et al., On a Portable Secure Information Protection Arrangement Using Active Control Devices, 2009 Second International Conference on Future Information Technology and Management Engineering, pp. 238-241.*

(Continued)

*Primary Examiner* — Roderick Tolentino
(74) *Attorney, Agent, or Firm* — Sunstein Kann Murphy & Timbers LLP

(57) ABSTRACT

A router is placed between a protected computer and devices with which the computer communicates, including peripherals and other computers. The router includes a list of authorized devices that are permitted to send data to the protected computer, against which requests to send data are checked. The router also communicates with a remote authentication service to authenticate devices requesting such permission. The authentication service may be a cloud-based identity service.

14 Claims, 4 Drawing Sheets

(56) References Cited

OTHER PUBLICATIONS

Yizheng et al., Design and Implementation of USB Key-Based JavaEE Dual-Factor Authentication System , 2009 International Conference on Information Management, Innovation Management and Industrial Engineering, pp. 443-446.*

Qian et al. On a Portable Secure Information Protection Arrangement Using Action Control Devices, 2009 Second International Conference on Future Information Technology and Management Engineering, IEEE pp. 238-241.

Yizheng et al. Design and Implementation of USB Key-based JavaEE Dual-factor Authentication System, 2009 International Conference on Information Management, Innovation Management and Industrial Engineering, IEEE pp. 443-446.

* cited by examiner

PROTECTING COMPUTERS USING AN IDENTITY-BASED ROUTER

CROSS-REFERENCE TO RELATED APPLICATION

This application is a continuation of U.S. application Ser. No. 13/324,737, filed Dec. 13, 2011, which claims the benefit of U.S. Provisional Application No. 61/422,854, filed Dec. 14, 2010. The contents of these applications are incorporated by reference in their entirety herein.

TECHNICAL FIELD

The present invention relates to protecting computer systems from receiving unauthorized data from other devices, and more particularly to placing a router between a computer system and a device, where the router authenticates the device using a remote authentication service before passing data between the device and the computer.

BACKGROUND ART

It is known in the prior art to connect peripheral devices to a computer. These devices include devices such as keyboards, mice, and external storage devices. Such devices are used to transmit data to the computer for use by computer software applications.

These connected peripherals are generally trusted devices, as they are physically attached to the computer. However, a malicious user may disconnect an attached peripheral and attach a device of the user's choosing, and thereby gain access to the data on the computer. Or, the malicious user may connect the device to an open port on the computer, such as a USB port, that is not already occupied by another device. Such connections, for example, permit the user to transmit a virus stored on a USB storage device to the computer, thereby infecting it for the user's gain. Or, the user may download sensitive data from the computer to the storage device without permission.

FIG. 1 is an illustration of a prior art system in which a first device 100 having an attached peripheral 110 uses a computer network 120 to communicate with a remote device 130. In this example system, the first device 100 may be a desktop computer, a laptop computer, a mobile phone such as a smartphone, or any device that is capable of executing an operating system. Peripheral device 110 may be, for example, a keyboard, a mouse, or an external storage device such as a thumb drive, that sends useful data to device 100. Several such peripherals 110 may simultaneously connect to first device 100, as is known in the art.

A user of the first device 100 may wish to communicate with other devices. Typically, this is done by way of a computer network 120, such as the Internet. Computer network 120 allows the first device 100 to communicate with a remote device 130. While the Figure is greatly simplified for the purposes of concise disclosure, computer network 120 may include the user's Internet Service Provider (ISP) and any number or type of computer networking devices, such as bridges, hubs, switches, and routers. Remote device 130 may be any device that is capable of executing an operating system.

As shown above, it is known in the prior art to route data between two devices. For example, the Internet may be used to route data between two computers, or between a computer and a mobile phone. Routers that route data between computer networks may be configured to perform a network address translation (NAT) that translates a routing address in one network into a routing address in a second network. Routers having NAT may be configured to permit or deny data received from a first network from being transmitted on the second network, based on the address of the device transmitting the data on the first network. This arrangement may be used as a firewall to prevent unauthorized data from being transmitted to a computer on the second network. However, it does not prevent a malicious user in the first network from obtaining the list of authorized network addresses. If the user obtains this list, she may transmit unauthorized data to a computer in the second network by creating a network message having a forged (and authorized) routing address. Network routers also operate to route data between computers, not between a computer and a peripheral device, and therefore cannot prevent a malicious user having physical access to the computer from transmitting unauthorized data to its software applications.

BRIEF SUMMARY OF DISCLOSED EMBODIMENTS

To address the above concerns, in various embodiments a router is placed between a protected computer and devices with which the computer communicates, including peripherals and other computers. The router includes a list of authorized devices that are permitted to send data to the protected computer, against which requests to send data are checked. The router also communicates with a remote authentication service to authenticate devices requesting such permission. The authentication service may be a cloud-based identity service, as described in more detail below.

Thus, in a first embodiment there is provided an apparatus for authenticating, to a first device, a second device transmitting data to the first device. The apparatus has three hardware interfaces: a first hardware interface capable of transmitting data to, and receiving data from, the first device; a second hardware interface capable of transmitting data to, and receiving data from, the second device; and a third hardware interface capable of transmitting data to, and receiving data from, an authentication service. The second device has a unique identifier, and the apparatus includes a memory in which is stored a set of unique identifiers. The apparatus also has a processor, coupled to the first, second, and third interfaces and to the memory, the processor being configured to execute five processes. These process are: to receive the unique identifier, a cryptographic nonce, and encrypted data from the second device using the second interface; to transmit the unique identifier to the authentication service using the third interface; to receive, from the authentication service using the third interface, a decryption key associated with the unique identifier; to decrypt the encrypted data using the decryption key to form decrypted data; and to permit transmission of data from the second interface to the first interface, when simultaneously (1) the decrypted data comprise the cryptographic nonce and (2) the received unique identifier is contained in the set of unique identifiers stored in the memory.

The first hardware interface may include a computer network interface. The second hardware interface may include a USB interface, a Bluetooth interface, or a wireless near-field communication interface. The third hardware interface may include a computer network interface. The authentication service may include an identity service remote from the first device. The unique identifier may include a network address. The decryption key may be contained in a digital certificate. The first device may be configured to prevent an executing software application from using any input data unless those input data are received from the first interface. The second device may have a network address, and the processor is further configured to: receive input data and the network address from the first interface; transmit the network address to the authentication service using the third interface; receive, from the authentication service using the third interface, an encryption key associated with the network address; encrypt the input data using the encryption key; and transmit the encrypted data to the network address of the second device using the second interface.

In a second embodiment there is provided a method of authenticating, to a first device, a second device transmitting data to the first device, using an apparatus coupled to both devices. The method comprises five processes: receiving, in the apparatus, from the second device, input data, a unique identifier, a cryptographic nonce, and encrypted data; transmitting the unique identifier from the apparatus to an authentication service; receiving, in the apparatus, from the authentication service, a decryption key associated with the unique identifier; decrypting the encrypted data using the decryption key to form decrypted data; and permitting transmission of data from the second device to the first device, when simultaneously (1) the decrypted data comprise the cryptographic nonce and (2) the received unique identifier is contained in a set of unique identifiers that is stored in the apparatus.

The first device may be a computer system. The second device may be a peripheral device. The authentication service may include an identity service remote from the first device. The unique identifier may include a network address. The decryption key may be contained in a digital certificate. The first device may be configured to prevent an executing software application from using any input data unless those input data are received from the first interface. Decrypting may include decrypting according to an encryption scheme that uses public and private keys. The method may also include notifying the first device about an unauthorized access attempt when either (1) the decrypted data do not comprise the cryptographic nonce or (2) the received unique identifier is not contained in the set of unique identifiers that is stored in the apparatus coupled to both devices.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

As used in this description and the accompanying claims, the following terms shall have the meanings indicated, unless the context otherwise requires:

A peripheral device for a computer is any device that is not a part of the computer but may communicate with the computer directly, without requiring that its communications pass through an intermediary device.

Figure 1:
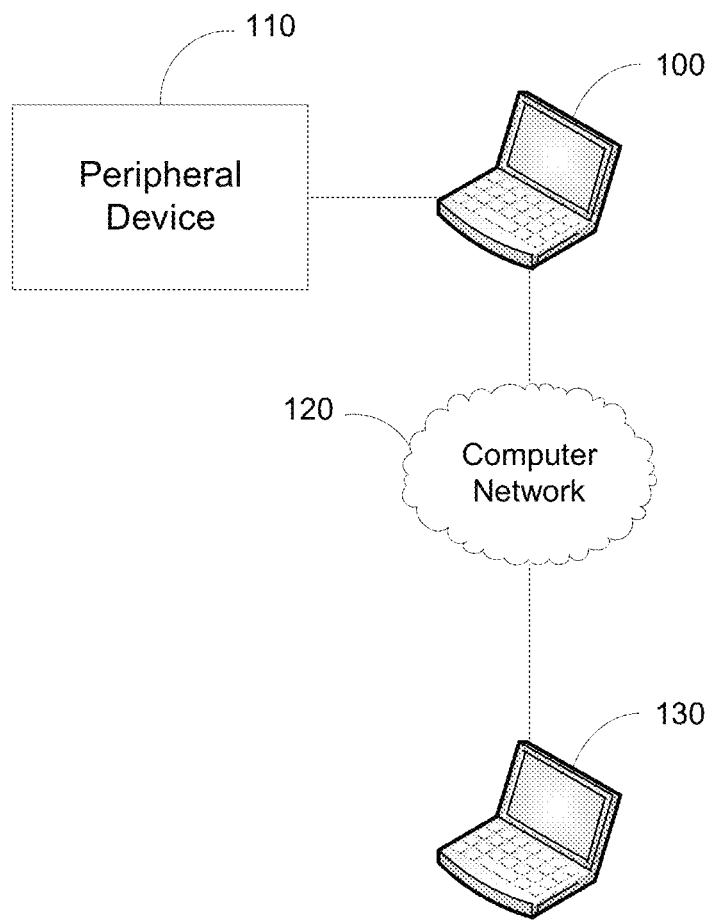
FIG. 1 is an illustration of a prior art system in which a first device having an attached peripheral uses a computer network to communicate with a second device.
Figure 2:
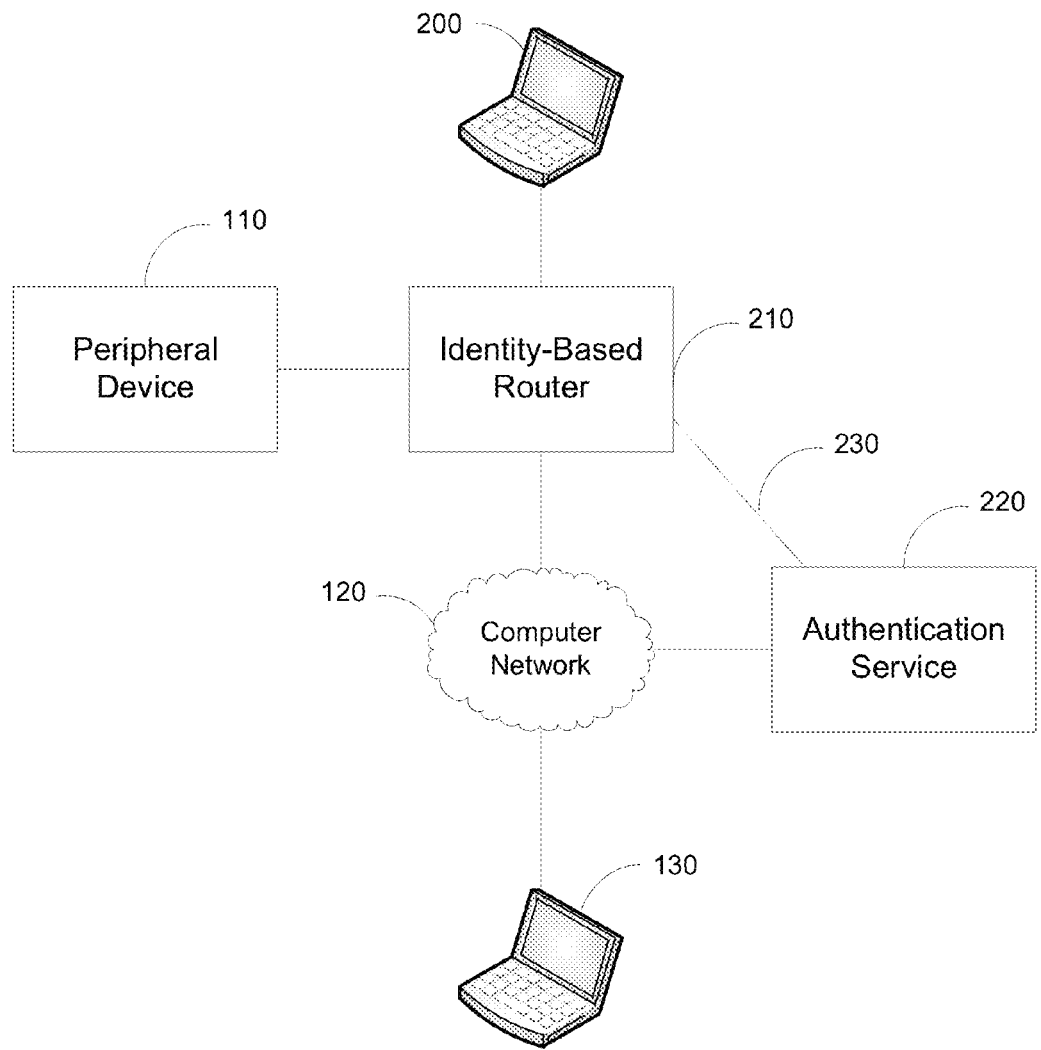
FIG. 2 is an illustration of an embodiment of the present invention, in which the peripheral device attaches to an identity-based router that uses a remote authentication service.

To prevent a peripheral 110, such as a portable storage device, from providing unauthorized data to device 100, a new system and method for connecting peripherals are disclosed. FIG. 2 is an illustration of an embodiment of the present invention, in which the peripheral device 110 attaches not to its device directly, but to an identity-based router 210 that uses a remote authentication service 220. Router 210 is designed to prevent unauthorized data originating from peripheral 110 (and remote device 130) from reaching protected device 200. Router 210 accomplishes this task by requiring a device to identify itself to the router 210 using cryptographic means, before router 210 sends any of its data to protected device 200. Once the cryptographic means have been received, router 210 contacts authentication service 220 to verify the identity of the device. Router 210 is further configured to permit access to only those devices whose unique identities have been recorded within the router. The construction of router 210 is described in more detail below in connection with FIG. 3, and its operation is described in connection with FIG. 4.

In accordance with this arrangement, device 110 becomes peripheral to the router 210, not to the protected device 200. Thus, any malicious user wishing to use peripheral 110 to provide unauthorized data to protected device 200 must attempt to bypass router 210, which is specifically designed to prevent such access. In some embodiments, the protected device 200 is not physically proximate to device 110. For example, a protected computer system may be in a server room, and the keyboard, mouse, and video monitor may be in another room, connected to the computer system by long cables. In such a scenario, router 210 may be situated in the server room, inaccessible to a person having physical access to the keyboard and mouse. In other embodiments, protected device 200 is programmed to ignore data sent from any built-in port, such as a USB port, except for data coming from router 210. Thus, even if a malicious user has direct physical access to protected device 200, she is unable to transmit data to device 200 from an unauthorized keyboard, mouse, or external storage unit 110. Such programming may be accomplished by patching the operating system of protected device 200, by changing the read/write permissions of various device driver files on protected device 200, or according to other methods known in the art. In such an embodiment, the protected device 200 is configured to prevent an executing software application from using any input data unless those input data are received from the router 210.

In accordance with a particularly useful embodiment of the invention, authentication service 220 is a cloud-based identity service. Such a service is described in my patent application Ser. No. 13/079,174, filed Apr. 4, 2011, which is herein incorporated by reference in its entirety. Alternately, authentication service 220 may be a certificate authority, as that phrase is known in the art, or other such service that provides digital certificates as part of a public key infrastructure. Communication between router 210 and authentication service 220 may be performed securely using any number of techniques. For example, such communication may be performed using double-blind encryption based on light-weight surrogate certificates, as described in my patent application Ser. No. 12/844,355, filed Jul. 27, 2010, which is herein incorporated by reference in its entirety. Or, communication between router 210 and service 220 may be performed using other encryption techniques known in the art or without encryption at all. Encryption-less communication may be used in embodiments requiring extremely low latency. In such an embodiment, for example, protected device 200, router 210, and service 220 are all provided in the same server room, and the communication occurs over a secure physical cable 230.

Figure 3:
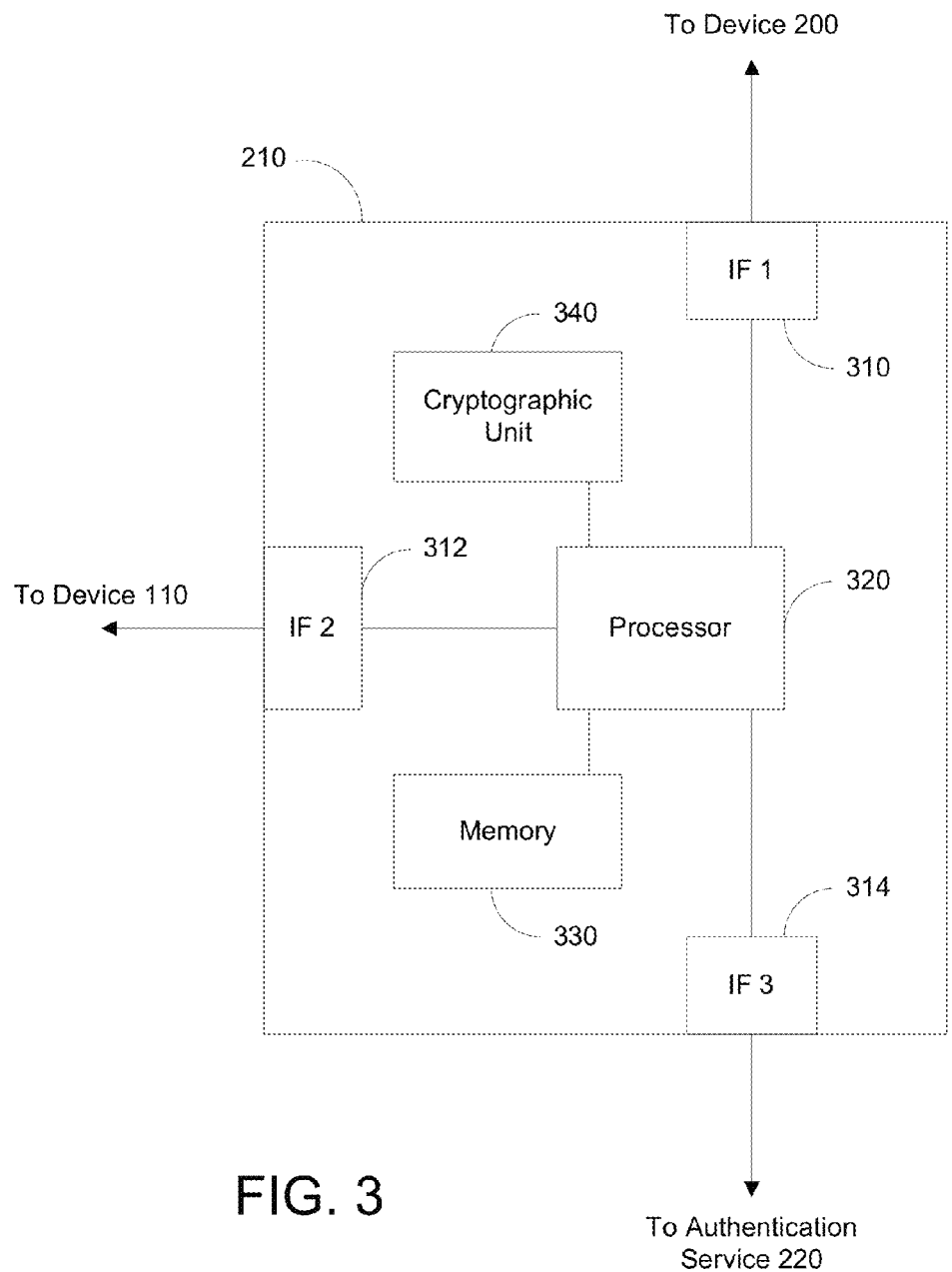
FIG. 3 is a block diagram showing the functional components of an identity-based router according to one embodiment.

FIG. 3 is a block diagram showing the functional components of an identity-based router 210. The example router includes three hardware interfaces 310, 312, 314, that are each capable of transmitting data to, and receiving data from, other devices. Such interfaces may be, for example, serial ports, parallel ports, phone ports, Ethernet ports, USB ports, Firewire ports, a Bluetooth transceiver, a near-field communication transceiver, or any other similar device known in the art. Interface 1 (310) is used to communicate with protected device 200, interface 2 (312) is used to communicate with peripheral device 110, and interface 3 (314) is used to communicate with authentication service 220. Typically, authentication service 220 may be reached using computer network 120, but in embodiments where interface 3 connects directly to authentication service 220 via cable 230, a fourth interface (not shown) may be used to connect device 200 to computer network 120 and other computing devices. Other embodiments of the router may have more interfaces to permit multiple peripheral devices to connect to multiple protected devices.

The hardware interfaces are connected to a processor 320. The processor is configured to receive and process data from the interfaces, using memory 330 and optional cryptographic hardware or firmware unit 340. Processor 320 may be a computing processor as known in the art, or it may be implemented as specialized hardware, such as a FPGA. Memory 330 may be volatile memory, non-volatile memory, or a combination of both. In addition to being useful for performing routing and/or cryptographic operations, memory 330 may also include a "white list" of unique identifiers that correspond to devices that are authorized to connect to protected device 200. The unique identifiers may be, for example, network addresses, such as IPv6 addresses or MAC addresses, or other unique identifiers such as manufacturing serial numbers. The white list itself may be configured by the protected computer using interface 1 (310).

Cryptographic unit 340, if provided, includes specialized hardware or firmware that permits extremely rapid processing of cryptographic operations, to reduce the computational workload of processor 320. Cryptographic unit 340 may be provided, for example, in a smartcard that is physically inserted into the chassis of router 210. If router 210 is configured so that cryptographic operations are performed only in cryptographic unit 340, then removal of the unit prevents all data from reaching protected device 200 (and prevents device 200 from transmitting data to peripheral 110 or network 120), thereby effectively and immediately isolating device 200 from all other networked devices. In one embodiment, the white list of authorized devices is not contained in memory 330, but in the aforementioned smartcard. In this way, even if a malicious user gains access to protected device 200, he may not authorize another device to connect to the protected device, thereby preventing him from transmitting any sensitive data from the protected device to another device of his choosing.

Figure 4:
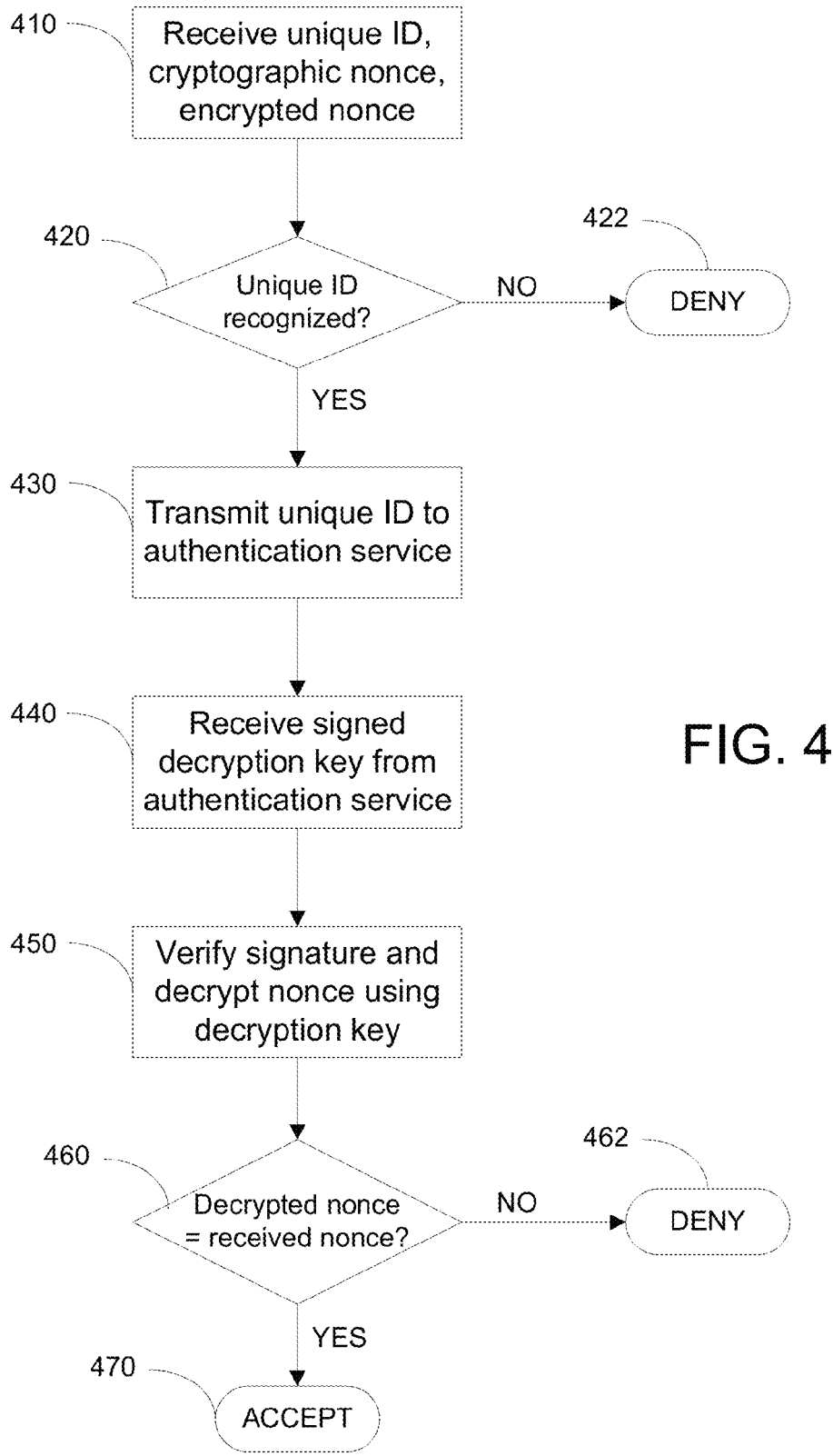
FIG. 4 is a flowchart showing the steps of a process in an identity-based router according to one embodiment for authenticating a peripheral device and passing its data to a protected device.

FIG. 4 is a flowchart showing the steps of a process in the processor of an identity-based router 210, according to one embodiment, for authenticating a peripheral device and passing its data to a protected device. In step 410, the processor receives a unique identifier, a cryptographic nonce, and an encryption of the nonce from a peripheral device, using interface 312. The nonce is typically a random number generated by the peripheral device, whose sole purpose is to authenticate the identity of the peripheral. In step 420, the processor compares the received unique ID against a "white list" stored in the router's memory. If the ID is not found, then the device is not authorized to send data to a protected device in the first instance, and the process continues to step 422 in which access is denied.

If the device is authorized, it must still be authenticated— in other words, the device claiming authorization may not be the actual, authorized device, but a different, suitably configured device substituted by a malicious user. To authenticate the device, in step 430 the unique identifier is transmitted to a remote authentication service. The remote authentication service obtains a digitally signed decryption key according to methods known in the art. For example, the decryption key may be a public key of the authorized device (but not any substituted device). In step 440, the processor receives this signed decryption key from the authentication service.

In step 450, the processor (or the cryptographic unit) verifies the digital signature of the decryption key, using methods known in the art. In one embodiment, the authentication service signs the decryption key using its own private key, and the router stores a self-signed digital certificate containing the public key of the authentication service. The latter certificate may be stored in a read-only memory (for example, on a physical smartcard inserted into the chassis of the router). The validity of the self-signed certificate may be verified because it is self-signed, and the signature of the received digital certificate may be verified using the public key of the signing authentication service. Because the certificate of the authentication service is stored in read-only memory, it cannot be forged.

Once the signature of the decryption key is verified, step 450 continues by decrypting the received, encrypted nonce using the decryption key. If the decrypted nonce is the same as the (unencrypted) nonce received in step 410, then the device is authenticated. Thus, in step 460, these two values are compared. If they are unequal, then the process continues to step 462 in which access is once again denied. However, if the nonce decrypted successfully, then the process continues to step 470, and the processor permits data to pass between the peripheral device and the protected device. It will be observed that, should the processor permit transmission of data between these devices, it must be simultaneously true that the decrypted nonce include the (unencrypted) nonce received in step 410, and the unique identifier is in the "white list" stored in the router's memory.

In steps 422 and 462, in which access to the protected device is denied, the router may take additional actions, such as logging the denial, and notifying the protected device or a system administrator that an unauthorized access was attempted. Such notification is especially important in step 462, in which an apparently authorize device was nevertheless not authenticated as being genuine. This may occur in a number of situations that are not otherwise untoward, including the authentication service returning an expired certificate, but may occur when a malicious user is attempting to substitute an unauthorized device using a valid identifier. The logging and notification functions may distinguish between these events, and provide different levels of urgency to the various functions depending on the severity of the event.

The embodiments of the invention described above are intended to be merely exemplary; numerous variations and modifications will be apparent to those skilled in the art. All such variations and modifications are intended to be within the scope of the present invention as defined in any appended claims.

It should be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Portions of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. An apparatus for authenticating a peripheral device to a computer when the apparatus is interposed between the peripheral device and the computer, the peripheral device having a network address and consisting of a keyboard, a mouse, or an external storage device, the apparatus comprising:
   a first hardware interface capable of transmitting data to, and receiving data from, the computer;
   a second hardware interface capable of receiving data from the peripheral device, the peripheral device having a unique identifier;
   a third hardware interface capable of transmitting data to, and receiving data from, an authentication service;
   a memory in which is stored a set of unique identifiers; and
   a processor coupled to the first, second, and third interfaces and to the memory, the processor being configured to:
      (i) receive the unique identifier, a cryptographic nonce, and encrypted data from the peripheral device using the second interface,
      (ii) transmit the unique identifier to the authentication service using the third interface,
      (iii) receive, from the authentication service using the third interface, a decryption key associated with the unique identifier,
      (iv) decrypt the encrypted data using the decryption key to form decrypted data,
      (v) permit transmission of data from the second interface to the first interface, when simultaneously (1) the decrypted data comprise the cryptographic nonce and (2) the received unique identifier is contained in the set of unique identifiers stored in the memory;
      (vi) receive input data and the network address from the first interface,
      (vii) transmit the network address to the authentication service using the third interface,
      (viii) receive, from the authentication service using the third interface, an encryption key associated with the network address,
      (ix) encrypt the input data using the encryption key, and
      (x) transmit the encrypted data to the network address of the peripheral device using the second interface.

2. An apparatus according to claim 1, wherein the first hardware interface includes a computer network interface.

3. An apparatus according to claim 1, wherein the second hardware interface includes a USB interface, a Bluetooth interface, or a wireless near-field communication interface.

4. An apparatus according to claim 1, wherein the third hardware interface includes a computer network interface.

5. An apparatus according to claim 1, wherein the authentication service includes an identity service remote from the computer.

6. An apparatus according to claim 1, wherein the decryption key is contained in a digital certificate.

7. An apparatus according to claim 1, wherein the computer is configured to prevent an executing software application from using any input data unless those input data are received from the first interface.

8. A method of authenticating a peripheral device to a computer using an apparatus interposed between the peripheral device and the computer, the peripheral device having a network address and consisting of a keyboard, a mouse, or an external storage device, the method comprising:
   receiving, in the apparatus, from the peripheral device, input data, a unique identifier, a cryptographic nonce, and encrypted data;
   transmitting the unique identifier from the apparatus to an authentication service;
   receiving, in the apparatus, from the authentication service, a decryption key associated with the unique identifier;
   decrypting the encrypted data using the decryption key to form decrypted data;
   permitting transmission of data from the peripheral device to the computer, when simultaneously (1) the decrypted data comprise the cryptographic nonce and (2) the received unique identifier is contained in a set of unique identifiers that is stored in the apparatus;
   receiving input data and the network address from the computer;
   transmitting the network address to the authentication service;
   receiving, from the authentication service, an encryption key associated with the network address;
   encrypting the input data using the encryption key; and
   transmitting the encrypted data to the network address of the peripheral device.

9. A method according to claim 8, wherein the authentication service includes an identity service remote from the computer.

10. A method according to claim 8, wherein the unique identifier includes a network address.

11. A method according to claim 8, wherein the decryption key is contained in a digital certificate.

12. A method according to claim 8, wherein the computer is configured to prevent an executing software application from using any input data unless those input data are received from the first interface.

13. A method according to claim 8, wherein decrypting includes decrypting according to an encryption scheme that uses public and private keys.

14. A method according to claim 8, further comprising notifying the computer about an unauthorized access attempt when either (1) the decrypted data do not comprise the cryptographic nonce or (2) the received unique identifier is not contained in the set of unique identifiers that is stored in the apparatus coupled to both devices.

* * * * *